United States Patent
Bi et al.

(10) Patent No.: US 8,565,684 B2
(45) Date of Patent: *Oct. 22, 2013

(54) METHOD AND APPARATUS FOR CONTROLLING REVERSE LINK TRANSMISSION

(75) Inventors: Hao Bi, Lake Zurich, IL (US); Zhijun Cai, Euless, TX (US); Robert M. Harrison, Grapevine, TX (US); Robert T. Love, Barrington, IL (US); John D. Reed, Arlington, TX (US)

(73) Assignee: Motorola Mobility LLC, Libertyville, IL (US)

( * ) Notice: Subject to any disclaimer, the term of this patent is extended or adjusted under 35 U.S.C. 154(b) by 1444 days.

This patent is subject to a terminal disclaimer.

(21) Appl. No.: 10/684,918

(22) Filed: Oct. 14, 2003

(65) Prior Publication Data

US 2007/0037523 A1    Feb. 15, 2007

(51) Int. Cl.
*H04B 17/00*    (2006.01)

(52) U.S. Cl.
USPC ........................................ 455/67.11

(58) Field of Classification Search
USPC ............ 455/115.1, 115.4, 452.2, 67.13, 135, 455/161.3, 277.2, 67.11, 61.3
See application file for complete search history.

(56) References Cited

U.S. PATENT DOCUMENTS

| 6,205,129 | B1 | 3/2001 | Esteves et al. | |
| 7,085,254 | B1 * | 8/2006 | Yun et al. | 370/342 |
| 7,542,769 | B1 * | 6/2009 | Chheda et al. | 455/453 |

* cited by examiner

*Primary Examiner* — Eugene Yun

(57) ABSTRACT

A communication device and method for controlling reverse link transmissions. The device receives a broadcast transmission signal and determines a quality level of the broadcast transmission signal. It then communicates with the base station to establish how frequently reverse link transmissions will occur depending on the determined quality level. Alternatively, a network element can determining when a parameter crosses a threshold and transmit a message to select wireless communication devices to start gating on a reverse link when the parameter crosses the threshold.

24 Claims, 6 Drawing Sheets

METHOD AND APPARATUS FOR CONTROLLING REVERSE LINK TRANSMISSION

CROSS-REFERENCE TO RELATED APPLICATIONS

This application is related to application entitled "WIRELESS BROADCAST SERVICE QUALITY INDICATOR AND METHOD", filed on Oct. 10, 2003 and commonly assigned to the assignee of the present application and which is hereby incorporated by reference.

FIELD OF THE DISCLOSURE

This disclosure relates generally to wireless communications systems, and more particularly to broadcast services in a wireless communications system.

BACKGROUND OF THE DISCLOSURE

There are proposals to provide broadcast communications services on certain channels of various wireless communications networks, such as time division multiple access (TDMA) and code division multiple access (CDMA) systems, including Global System for Mobile communications (GSM) and wide band systems such as CDMA 2000 and UMTS WCDMA systems. These broadcast communication services are intended to provide a variety of information content in a variety of formats. For example, news, weather, stock information, and sports information can be provided using a video broadcast format, a picture format, and a text ticker format. Other information content includes music, music video, and entertainment. Each general type of information content could be provided using any number and combination of formats.

Generally, broadcast communications are unidirectional from a wireless base station to one or more wireless terminals. For example, a video broadcast may require a transmission rate of several ten-thousand bits per second (bps) in the forward direction from the base station to the mobile station while requiring only several thousand bps in the reverse link direction to support signaling. Because of the pronounced asymmetry of transmission, the quality of the received signal at the wireless terminal is an important parameter in supporting broadcast services.

Usually, the broadcast communication services are transmitted on a channel at a fixed power. With dynamic radio conditions that are typical with wireless communications, users do not want to receive a broadcast service only to find that the quality of the reception is unsatisfactory. Frequent occurrences of poor reception quality, especially when a user is paying by the minute, will degrade the user experience. However, network operators also desire to limit broadcast transmission signal strength for a variety of reasons. Thus, there is a desire to obtain broadcast services in a wireless communication system at an expected quality level without having to transmit at unnecessarily high signal power levels.

The various aspects, features and advantages of the disclosure will become more fully apparent to those having ordinary skill in the art upon careful consideration of the following Drawings and accompanying Detailed Description.

BRIEF DESCRIPTION OF THE DRAWINGS

Exemplary embodiments of the present invention will be described with reference to the following figures, wherein like numerals in different figures designate like elements and which embodiments are provided to illustrate various principles and advantages of the invention defined by the claims, and wherein:

DETAILED DESCRIPTION OF THE INVENTION

Figure 1:
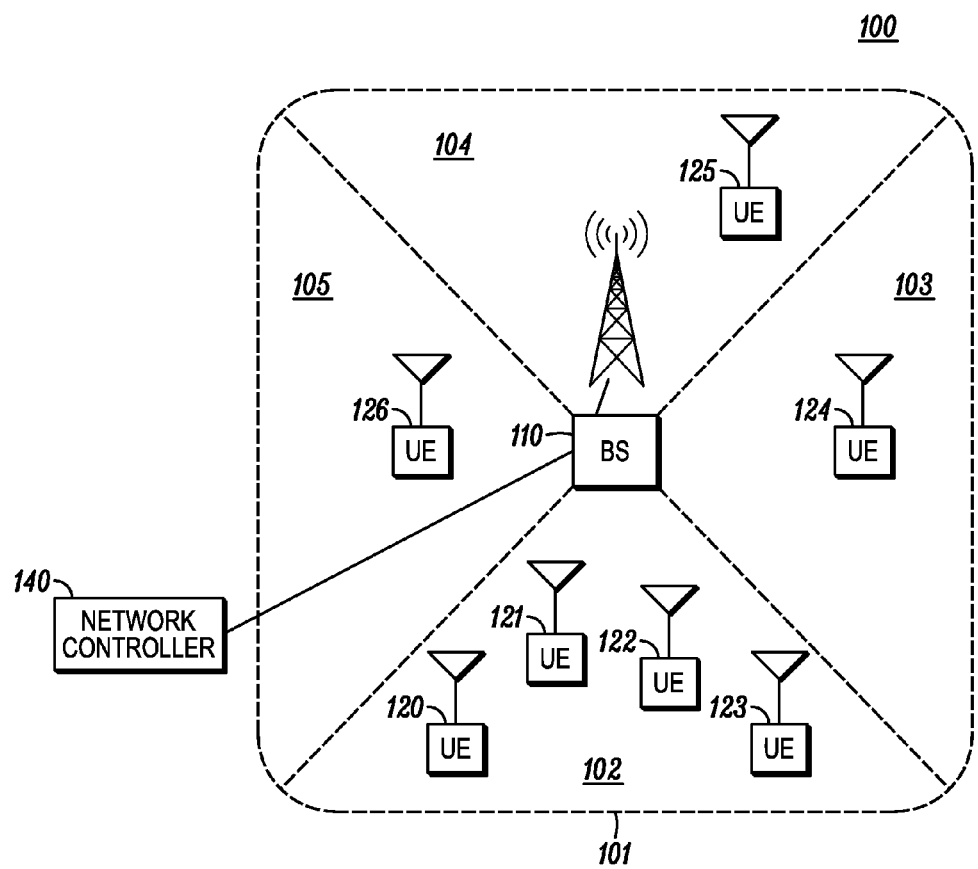
FIG. 1 illustrates a communication system.

A variety of broadcast communications for cellular networks have been proposed. Examples include using the forward broadcast supplemental channel (F-BSCH) and forward broadcast fundamental channel (F-BFCH) for broadcast multicast service (BCMCS) in the development of the CDMA 2000 Release specification and the secondary common control physical channel (S-CCPCH) used in the WCDMA/UMTS specification. The goal is to efficiently provide common forward link bit streams to a group of communication devices. Even though communication devices, such as mobile stations, in broadcast multicast service are usually idle in reverse link transmission and the fast power control of broadcast channels provides little gain when the number of mobile devices becomes large, mobile devices still transmit reverse pilot channel and reverse power control sub-channel information, which cause significant reverse link interference and limit broadcast multicast service capacity. The present invention preferably reduces the reverse channel load associated with fast power control of the broadcast channels by at least 50 percent.

The core network and access network are wireless (wide area network or local area network). Wireless, can be universal mobile telephone system (UMTS), GSM, and CDMA, circuit switched or packet switch. The communication systems of interest are those that facilitate voice or data or messaging services broadcast over one or more networks. Examples of two-way systems include wireless cellular systems, which use analog, CDMA, and TDMA technology, include GSM and Universal Mobile Telecommunication Service (UMTS), 1 G, 2 G, 2.5 G, 3 G, 4 G and beyond systems (where G refers to generation) and variants or evolutions thereof. Furthermore, the systems may be wide area networks, local area networks, or combinations thereof, and the user devices of interest can support short-range communications, long-range communications, or both long and short-range communications. Examples of short range communications include cordless communications systems, pico-networks, wired or wireless LAN systems such as those supporting IEEE 802.11 standard, Blue tooth connections, and the like. Such systems preferably utilize CDMA, frequency hopping, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System), or integrated digital enhanced network (iDEN™) protocol. Such systems may support trunk or dispatch functions, direct individual or group calling, and support circuit switched, Internet or other connections.

Communication devices, or user devices, in such systems may include wired telephones, cellular telephones, cordless telephones, so-called internet or internet protocol phones, modems, routers, access points, computers, personal digital assistants, palm top devices, and variations and evolutions thereof.

The instant disclosure includes exemplary devices, systems, and methods, which disclose various embodiments. However, the structure and function disclosed is not intended to limit the invention, but rather to enhance an understanding and appreciation for the inventive principles and advantages. The invention is limited solely by the claims.

Terms used in the specification and claims may be associated by those skilled in the art with terminology appearing in a particular standard, such as CDMA, GSM or 802.11 standards, or such terminology may not appear in a particular standard. Association with a standard is not intended to limit the invention to a particular standard, and deviations from the language in a particular standard is not intended to preclude the invention from applying to such standard. Rather, the terms used are provided solely for the purpose of explaining the illustrated examples without unduly burdening the specification with multiple explanations to accommodate language variations of all possible standards, systems, and networks. It is further understood that the use of relational terms, if any, such as first and second, top and bottom, and the like are used solely to distinguish elements or actions without necessarily requiring or implying any actual such relationship or order between such entities or actions.

Those skilled in the art will recognize that the inventive functionality and many of the inventive principles may be implemented using software programs, hardware circuits such as integrated circuits (ICs), programmable logic devices, or a combination thereof. It is expected that one of ordinary skill guided by the concepts and principles disclosed herein will be readily capable of generating and selecting software programs and/or ICs with minimal experimentation. In the interest of brevity, further discussion of such software and ICs, if any, will be limited to those necessary to gain an understanding of the principles and concepts used by the preferred embodiments.

Somewhat more particularly, techniques are disclosed for gating of reverse link transmissions using network initiated gating, user device initiated gating, and collaborative user device and network established gating. Reverse link gating as used herein refers to dynamically altering the frequency of reverse link transmissions, and may refer to increasing, decreasing, initiating or halting reverse link transmissions. In addition to regular reverse fundamental channel gating and reverse pilot gating, independent gating of reverse power control sub-channels is envisioned, even when reverse traffic channels are present, to capture reductions in reverse link communications.

With reference now to FIG. 1, an exemplary wireless communication system 100 is disclosed. The system includes a base station 110 and a network controller 140. The base station supports communication links with user devices located in cell 101. The base station may include a directional antenna array permitting coverage in distinct sectors 102-105, or the entire cell may be the sectors covered by the base station. User equipment 120-126 are served by base station 110 while in the cell 101, but those skilled in the art will recognize that the user equipment will move through the cell at varying speeds depending on the type of user equipment, the activity of the user, and the users mode of transportation (walking, bicycle, car, bus). Additionally, the number of users will vary as user equipment is powered on and off, and users move into and of the cell. User devices will also move into and out of the sectors of the cell 101. Some, or all, of the user devices 120-126 may receive broadcast services.

Figure 2:
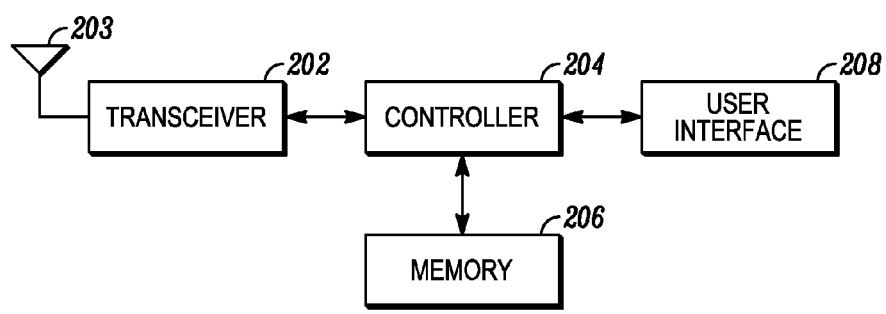
FIG. 2 is a circuit schematic in block diagram form illustrating a communication device.
Figure 3:
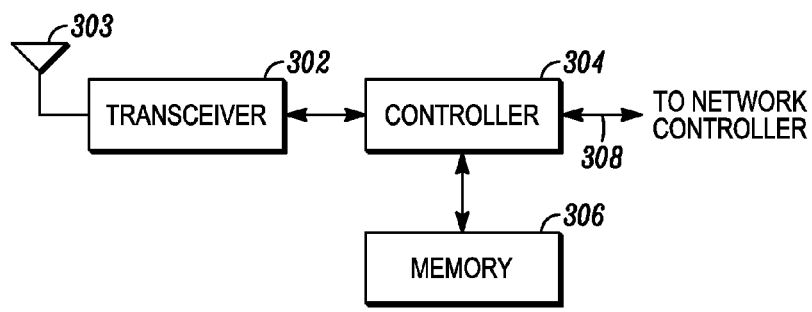
FIG. 3 is a circuit schematic in block diagram form illustrating a base station.

An exemplary user device 120 (FIG. 2) includes a radio transceiver 202 for communicating with a base station via a communication link established by antenna 203. The transceiver may be a single transceiver, such as a cellular telephone receiver or a data modulator/demodulator, or it may include multiple transceivers such as multiple cellular transceivers, or an 802.11 transceiver and a cellular radio transceiver, an Ethernet transceiver and a cellular transceiver, or any other combination of wired and wireless transceivers. A controller 204 includes processing and memory 206 for controlling the user device operation. The controller 204 may include integrated memory, or a micro-controller and external memory, and the memory 206 may be volatile and/or non-volatile memory. As used herein, micro-controller can be implemented using any microprocessor, digital signal processor, programmable logic, discrete logic units, software processes, a combination thereof, or the like. The user device 120 will typically include a user interface 208, such as a keypad, touch screen, speaker and microphone.

An access network, which in the illustrated example includes a base station 110, will similarly include a transceiver 302, an antenna 303 and a controller 304, with memory 306, for communicating with user devices. The base station will include additional circuitry (not shown) for communicating with the radio network controller via communication bus 308.

As part of the broadcast service provisioning, it is advantageous for the base station 110 to receive feedback from the user devices. In the illustrated example user devices 120-123 in sector 102 will be monitored for power control of broadcast signals in sector 102. User devices 120-123 have a program stored in memory 206 that controls requests to the base station for power increases if the broadcast message from base station 110 is not strong enough to reach the user devices with a minimum quality. On the other hand, if the broadcast signal is strong enough that the broadcast signal is above a maximum signal quality, the program in memory 206 of user devices 120-123 will request that the power level be decreased. The algorithm stored in memory 306 of base station 110 controls the base station to respond to such requests for increases and decreases by giving priority to power increase requests. In a preferred embodiment, the priority of increased power requests is such that the algorithm stored in memory 306 controls the base station to increase power when any one of user devices 120-123 requests increased power and decreases power when all user devices 120-123 request decreased power. As a consequence, the user devices 120-123 receiving the weakest signal will control the power level of the broadcast transmissions, since as long as these devices request power increases, requests for power decreases from other devices receiving a strong signal will be ignored.

Figure 4:
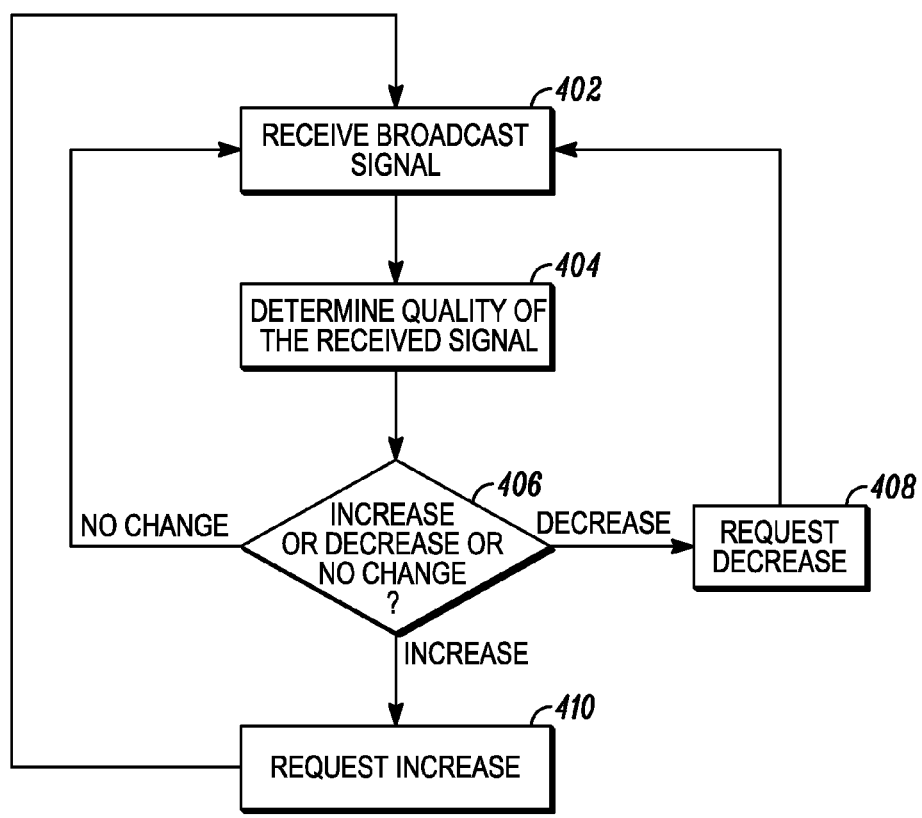
FIG. 4 is a flow chart illustrating operation of a communication device.

With reference now to FIG. 4, operation of a wireless communication device 120 includes receiving a broadcast signal from base station 110, as indicated in block 402. A quality of the received broadcast signal is determined, as indicated in block 404. For example, the signal-to-noise ratio (SNR), the bit-error rate (BER), the symbol-error rate (SER), or the frame-error rate (FER) may be used to determine the quality of the received signal. The wireless communication device 120 can use this information to determine whether the quality of the broadcast signal indicates that the user device 120 needs to request that the base station 110 increase or decrease the power of the broadcast transmission signal, or if no change request is needed, as indicated in step 406. Those skilled in the art will recognize that the signal quality required for the broadcast signal to be effective can be determined, and further if desired that the quality can be dependent on the use for the broadcast signal information (for example data, text, and video may require different quality signals for a successful transmission). It is envisioned that the threshold can be communicated from the base station, either as part of a broadcast or independently thereof, or a stored value may be retained in the memory 206 of user device 120. At levels below this received signal quality threshold, increases in broadcast message power will produce meaningful improvement in signal reception quality, and above this threshold value further increases in signal strength will not produce significantly improved results. When the received signal is above this threshold, a request will be made for a decrease in transmission power, as indicated in step 408, and when below this threshold, a request will be made to increase the power of the broadcast transmission, as indicated in step 410. A request for increased power is referred to hereinafter as a "power up" and a request for decreased power is referred to herein as a "power down."

Figure 5:
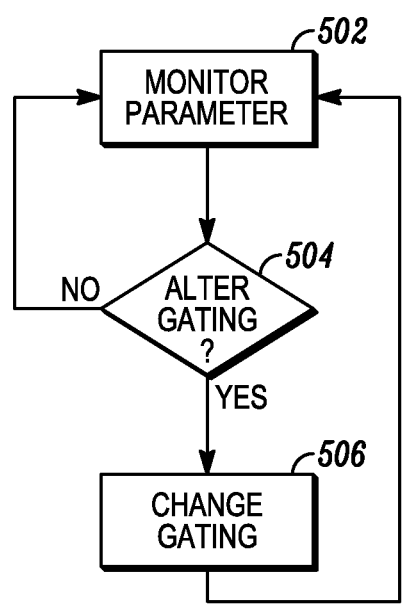
FIG. 5 is a flow chart illustrating operation of a communication system.

The user device 120 can communicate with the base station 110 to establish gating of the reverse link communications, and optionally determine a gating rate or frequency or periodicity. As used herein, the rate, frequency or periodicity refers to how frequently the transmissions will occur. According to a first embodiment, the network element makes this determination depending on a monitored parameter, as indicated in step 502 of FIG. 5. The network element determines when the monitored parameter indicates that gating should change, as indicated in step 504. The parameter may for example be the number of mobile devices or the variance of the base station broadcast signal transmission power. The network element will initiate reverse link gating if it is not taking place, or halt reverse link gating if it is currently taking place in step 506. The network element can use the frequency of user device power increase requests as a basis for selecting the user devices with the highest feedback rate, and gate other devices.

Figure 6:
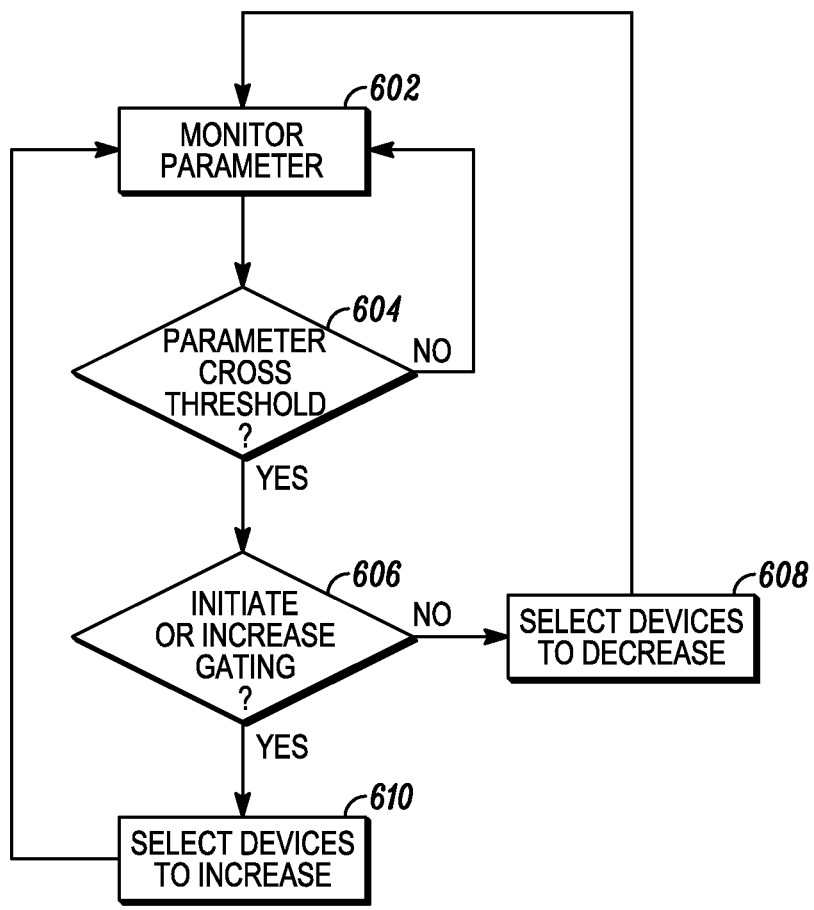
FIG. 6 is a flow chart illustrating alternate operation of a communication system.

A first alternate embodiment of a gating decision in the network element will now be described with respect to FIG. 6. The network element, which may be in the base station as illustrated, or the network controller, or some other network entity, monitors a parameter, which may be related to the broadcast channel, as indicated in block 602. It is envisioned that the parameter may represent the variability of a broadcast channel (for example the F-BSCH or F-BFCH used in CDMA 2000) transmit power. Alternatively, the parameter may be the number of user devices in a sector of a base station 110. The controller 304 determines when the parameter crosses a threshold as indicated in block 604, for example detecting when the variability (for example the difference between the peak and minimum) exceeds a threshold value (for example 10 percent of the average peak power level, but can vary depending on the system) within a predetermined time window (for example a 1 second period, that can vary depending on the system). Alternatively, the parameter could be a number of active user devices in a sector, and the controller 304 can detect when this number exceeds a threshold level (for example, the threshold could be in the range from 20-100 user devices, or more specifically 50 user devices, but the actual number will depend on the system). In either case, when the parameter crosses the threshold, as determined at step 604, the base station is triggered to send signaling to user devices to alter gating on the reverse link.

The network element controller 304 will determine whether the gating needs to be increased or decreased in step 606. If the gating needs to be initiated, or the frequency of reverse link communications needs to be decreased for some devices, the network element will select the devices to alter gating in step 610. User devices closest to the fringe of the cell 101, or blocked by buildings between the communication device and the base station 110, and those moving at higher velocities, will require a higher broadcast signal power, whereas other devices receiving a stronger signal will not impact the broadcast signal power. Accordingly, the network element can use the location of user devices in the network or the frequency of increase requests as the basis for determining which devices need to initiate gating or otherwise reduce the frequency of reverse link communications. In particular, those devices with the lowest frequency of increase requests, or no increase requests, will be most heavily gated.

In step 608, the network element (controller 304) will either cause all devices to halt gating or increase the frequency of reverse link communications, or it will select particular devices to alter gating. The network element can use the location of user devices in the network or the frequency of increase requests as the basis for determining which devices need to initiate gating, or reduce the frequency of reverse link communications. Those user devices with highest frequency of increase requests will be least gated.

It is envisioned that in-band signaling can be sent over a broadcast channel (for example the F-BSCH or F-BFCH used in CDMA 2000) to notify all user devices in a sector of the start time of gating, and optionally a gating rate change, in block 610. Similarly, it is envisioned that in-band signaling can also be sent over the broadcast channel (for example the F-BSCH or F-BFCH used in CDMA 2000) to notify all mobile devices in a sector of the halt time of gating, and optionally a gating rate change, in block 608. Alternatively, selective gating of reverse links on a user device basis can be achieved by sending signaling over a mobile stations control channel (for example the forward-dedicated control channel (F-DCCH) used in CDMA 2000). In this manner, user devices can be assigned individual times for gating rate changes, and individual gating rates, based upon where the mobile is located, the quality of signal received by each user device, or some other criteria. For example, user devices near the cell edge will typically set the forward link power requirements for a cell or cell sector, and higher rate power control will benefit these user devices. Conversely, user devices in close proximity to the base station will rarely request more power, and their power control can be gated more heavily as variations requested by these devices will typically not result in changes in the broadcast signal power level. Additionally, the inventors have found that user devices close to the base station will likely require less signaling (related to soft handoff, for example), such that they may be gated more heavily (for example by having fewer reverse link transmissions) without detracting from the performance observed by users of the system.

It can thus be seen that the decision to gate individual user devices can be made using various criteria. One criterion is to measure the number of power increase requests from a user device over a predetermined time period (such as a 5 second interval), and to gate the reverse link if the number of power increase requests is small (less than threshold number such as 2). An alternative method is to use a measurement report (for example pilot strength) to determine if the device is in need of more updates. Those mobiles with the weakest channel or experiencing the most fading (vehicles traveling at the lowest velocity) will require the most power, and thus they will drive the broadcast transmission power. Yet another alternative method is to compare the ratio of received Eb/Nt to an Eb/Nt threshold (where Eb is the received energy per bit and Nt is the total interference and noise power), and if below this threshold, the mobile would request that the base station increase broadcast power.

Figure 7:
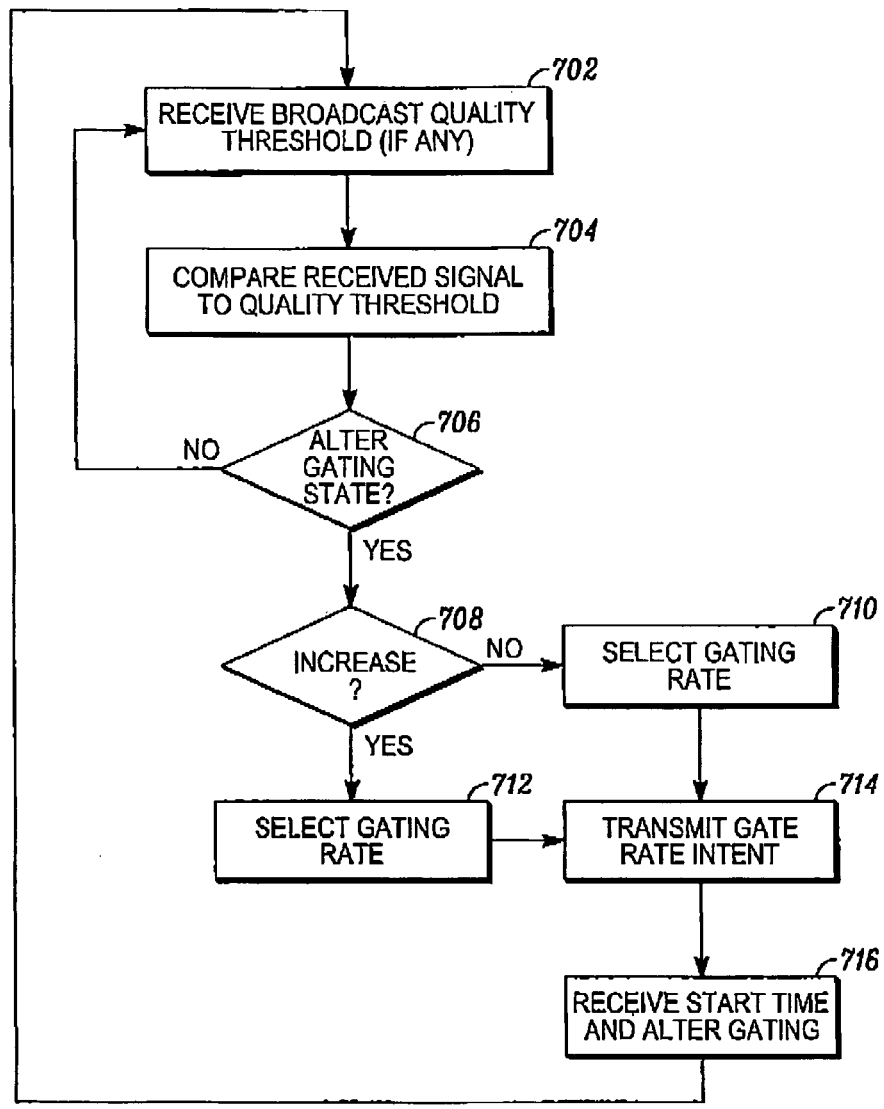
FIG. 7 is a flow chart illustrating alternate operation of a communication device.

Another alternate embodiment of the invention employs user device initiated gating as described herein with respect to FIG. 7. User device initiated gating can optionally be initiated based on a broadcast quality threshold transmitted from the base station 110 or a predetermined threshold level stored in the user device memory 206. The user device receives a broadcast quality threshold (QT) (QT can be based on various metrics, such as SNR, BER bit error rate, SER symbol error rate, or FER frame error rate), in step 702. The user device controller 204 compares the actual quality metric of a received signal to the quality threshold in step 704. Depending on the comparison, the controller 204 will determine whether to enable or disable gating, or select a different gating rate as indicated in step 706. When the user device detected received broadcast quality first exceeds the quality threshold, QT, for T seconds or x db, the user device determines a desired lower gating rate in steps 708 and 710, and signals its intent to gate (along with the new gating rate) to the serving base station, or base stations, in step 714. The selected rate may for example be ½ to ½₀th of the frequency of non-gated reverse path transmission, or any fraction there between, and the process may step through these levels to gradually transition from complete gating to no gating. Upon receiving an acknowledgement and action time the mobile station proceeds to alter gating of the reverse link transmission in step 716. It will be recognized that the change could be to decrease the frequency of reverse path transmissions or to fully enable gating. When the mobile station's received broadcast quality first falls below the QT for T2 seconds or by y dB, as determined in steps 708 and 712, then the user device signals its intent to change its gating rate (along with the new gating rate) to the serving base station in step 714. Upon receiving an acknowledgement and action time from the base station, the mobile station changes its gating rate in step 716. It will be recognized that the change could be to increase the frequency of reverse path transmissions or to turn off (disable) gating. By requiring time period T1 and T2, which may for example be 1-5 seconds, and/or x and y db variations, which may be 5-20 dB, hysteresis is provided and oscillating between decisions avoided.

Thus, it can be seen that a system is proposed wherein when the number of users is large, the method will reduce the reverse link overhead (including the power control feedback) which is beneficial to the network. The fast power control gain in the large-number of devices situation is negligible and can be ignored.

Base stations can detect when fast power control gains are likely to be small by measuring the variability of the broadcast channel (for example the F-BSCH or F-BFCH used in CDMA 2000) transmit power responsive to power increase and power decrease requests, or by counting the number of user devices receiving the broadcast (for example the BCMCS described in the CDMA 2000) transmission.

In-band signaling on the broadcast channel (for example the F-BSCH or F-BFCH used in CDMA 2000) can be used to control the start time and the rate of gating for all user devices receiving the broadcast transmission. Controlling all of the devices in a sector or cell is efficient (on the forward link) because a single message can be employed to control all user devices.

Alternatively, selective gating of devices can be achieved with signaling over each device's forward link dedicated channel (for example the F-DCCH used in CDMA 2000). Selective gating enables more accurate power control of the forward link broadcast channels (such as the F-BSCH or the F-BFCH used in CDMA 2000), since it can enable gating of only those user devices having little impact on forward link power control.

By providing user device initiated gating, reverse link interference can be reduced while the user device received broadcast signal quality is satisfied.

Additionally, reverse link gating can be used (for example with the CDMA 2000 broadcast channel or W-CDMA's Multimedia Broadcast/Multicast Service (MBMS)) to reduce reverse link interference and increase overall system capacity.

Thus it can be seen that improved methods and apparatus are disclosed. While this invention has been described with respect to specific embodiments thereof, it is evident that many alternatives, modifications, and variations will be apparent to those skilled in the art. For example, various components of the embodiments may be interchanged, added, or substituted in the other embodiments. Various changes may be made without departing from the spirit and scope of the invention as defined by the claims.

We claim:

1. A method of operating a mobile user device to gate reverse link transmissions, the method comprising:
   receiving a broadcast signal by the mobile user device;
   comparing by the mobile user device a quality of the received broadcast signal to a quality threshold;
   determining by the mobile user device whether the quality of the received broadcast signal exceeds the quality threshold,
   in the event that the quality of the received broadcast signal exceeds the quality threshold:
      determining a gating rate based on the quality of the received broadcast signal, wherein the gating rate establishes a time period between reverse link communications;
      communicating, to a network control element, an intent to gate at the gating rate;
      receiving an acknowledgement, from the network control element, authorizing reverse link gating at the gating rate; and
      transmitting reverse link communications at the gating rate responsive to receiving the acknowledgment.

2. The method according to claim 1, further including the step of receiving the quality threshold from the network control element.

3. The method according to claim 1, wherein the step of determining whether the quality of the received broadcast signal exceeds the quality threshold includes the step of determining whether the quality of the received broadcast signal exceeds the quality threshold for a first time period.

4. The method according to claim 3, further comprising:
   determining whether the quality of the received broadcast signal is below the quality threshold for a second time period;
   in the event that the quality of the received broadcast signal is below the quality threshold for the second period of time:
      transmitting, to the network control element, an intent to change the gating rate to a new gating rate, the new gating rate being lower than the gating rate and resulting in a decreased time period between reverse link communications;

receiving, from the network control element, a new rate acknowledgement, including an action time at which reverse link gating is to commence at the new gating rate; and transmitting reverse link communications at the new gating rate responsive to receiving the new rate acknowledgment.

5. The method according to claim 1, wherein the step of receiving an acknowledgment includes receiving, from the network control element, an action time at which reverse link gating is to commence.

6. A method for controlling reverse link transmissions in a wireless communication network that includes at least a network control element and at least one mobile user device, the method comprising:

determining, by the network control element, whether a parameter relating to broadcast transmission quality exceeds a threshold; and responsive to determining that the parameter exceeds the threshold, transmitting, by the network control element, a message to the at least one mobile user device, the message instructing the at least one mobile user device to alter the frequency of reverse link transmissions at a specified rate.

7. The method according to claim 6, wherein the parameter is a transmit power variability of a broadcast signal, and wherein the step of determining includes determining whether the transmit power variability of the broadcast signal exceeds a threshold.

8. The method according to claim 6, wherein the parameter is a quantity of mobile user devices in a sector of the wireless communication network and wherein the step of determining includes determining whether the quantity of mobile user devices in the sector exceeds a threshold.

9. The method according to claim 6, further comprising:

broadcasting a signal to notify all mobile user devices in a sector of the wireless communication network to initiate gating reverse link transmissions at the specified gating rate.

10. The method according to claim 9, wherein the broadcast signal further includes a gating start time.

11. The method according to claim 6, wherein the step of transmitting the message includes transmitting the message over a forward dedicated control channel (F-DCCH) of the at least one mobile user device.

12. The method according to claim 11, wherein the message includes an individual start time.

13. The method according to claim 6, wherein mobile user devices located near an edge of a cell of the wireless communication network are less gated than mobile user devices located near a base station of the wireless communication network.

14. The method according to claim 6, wherein the parameter is a strength of a pilot signal for a broadcast transmission channel as measured at the at least one mobile user device.

15. A network element comprising:

a controller operable to determine whether a parameter relating to broadcast transmission quality exceeds a threshold and, when the parameter exceeds the threshold, generate a message instructing a plurality of mobile user devices to alter the frequency of reverse link transmissions at a specified rate; and a transceiver coupled to the controller and operable to transmit the message to the plurality of mobile user devices.

16. The network element according to claim 15, wherein the parameter is a transmit power variability of a broadcast signal, and wherein the controller determines whether the transmit power variability of the broadcast signal exceeds a threshold.

17. The network element according to claim 15, wherein the parameter is a quantity of mobile user devices in a coverage area of the wireless communication network and wherein the controller determines whether the quantity of mobile user devices in the coverage area exceeds a threshold.

18. A method for controlling reverse link transmissions in a wireless communication network, the method comprising:

determining at least one of (a) a quantity of mobile user devices in a coverage area of a base station and (b) a variance in broadcast signal transmission power of the base station, to produce a monitored parameter;

determining whether the monitored parameter exceeds an associated threshold; and responsive to determining that the monitored parameter exceeds the associated threshold, sending a message to at least one mobile user device, the message instructing the at least one mobile user device to start gating reverse link transmissions at a gating rate.

19. A wireless communication system comprising:

a base station;

a network element coupled to the base station, the network element being operable to:

determine at least one of (a) a quantity of mobile user devices in a coverage area of the base station and (b) a variance in broadcast signal transmission power of the base station, to produce a monitored parameter, determine whether the monitored parameter exceeds an associated threshold, and responsive to determining that the monitored parameter exceeds the associated threshold, send a message to at least one mobile user device via the base station, the message instructing the at least one mobile user device to start gating reverse link transmissions; and a mobile user device located within the coverage area of the base station, the mobile user device including:

a mobile device transceiver operable to receive the message from the base station, and a mobile device controller coupled to the mobile device transceiver, the mobile device controller operable to gate reverse link transmissions as instructed in the message.

20. A wireless mobile user device comprising:

a transceiver operable to at least receive a broadcast signal; and a controller coupled to the transceiver, the controller operable to:

compare a quality of the received broadcast signal to a quality threshold;

determine whether the quality of the received broadcast signal exceeds the quality threshold; and in the event that the quality of the received broadcast signal exceeds the quality threshold:

determine a gating rate based on the quality of the received broadcast signal, wherein the gating rate establishes a time period between reverse link communications;

communicate, via the transceiver, an intent to gate at the gating rate to a network control element;

receive, via the transceiver, an acknowledgement from the network control element, the acknowledgment authorizing reverse link gating at the gating rate; and transmit, via the transceiver, reverse link communications at the gating rate responsive to receiving the acknowledgment.

21. The wireless mobile user device according to claim 20, wherein the controller is further operable to receive, via the transceiver, the quality threshold from the network control element.

22. The wireless mobile user device according to claim 20, wherein the controller is further operable to determine whether the quality of the received broadcast signal exceeds the quality threshold by at least determining whether the quality of the received broadcast signal exceeds the quality threshold for a first time period.

23. The wireless mobile user device according to claim 22, wherein the controller is further operable to:

determine whether the quality of the received broadcast signal is below the quality threshold for a second time period; and in the event that the quality of the received broadcast signal is below the quality threshold for the second period of time:

transmit, to the network control element via the transceiver, an intent to change the gating rate to a new gating rate, the new gating rate being lower than the gating rate and resulting in a decreased time period between reverse link communications;

receive, from the network control element via the transceiver, a new rate acknowledgement, including an action time at which reverse link gating is to commence at the new gating rate; and transmit, via the transceiver, reverse link communications at the new gating rate responsive to receiving the new rate acknowledgment.

24. The wireless mobile user device according to claim 20, wherein the controller is further operable to receive, from the network control element via the transceiver, an action time at which reverse link gating is to commence.

* * * * *